Dec. 6, 1949 W. J. METZGER 2,490,453
AUXILIARY CAR COUPLING DEVICE
Filed June 20, 1944 3 Sheets-Sheet 1

INVENTOR
William J. Metzger
BY
Clarence Kerr
ATTORNEY

Dec. 6, 1949 W. J. METZGER 2,490,453
AUXILIARY CAR COUPLING DEVICE
Filed June 20, 1944 3 Sheets-Sheet 2

INVENTOR
William J. Metzger
BY
Clarence D. Kerz
ATTORNEY

Dec. 6, 1949 W. J. METZGER 2,490,453
AUXILIARY CAR COUPLING DEVICE
Filed June 20, 1944 3 Sheets-Sheet 3
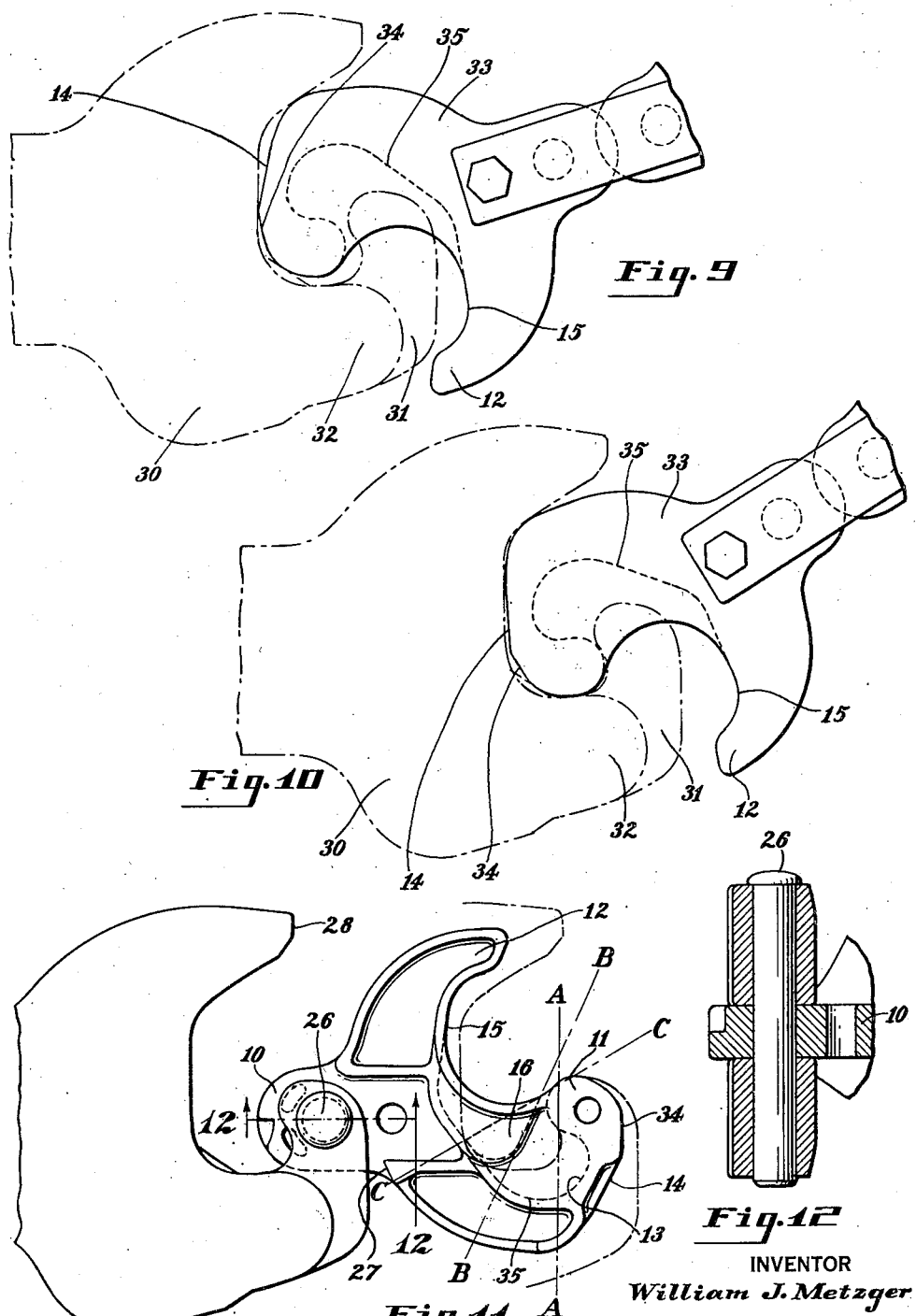
INVENTOR
William J. Metzger
BY
ATTORNEY Patented Dec. 6, 1949

2,490,453

UNITED STATES PATENT OFFICE 2,490,453

AUXILIARY CAR COUPLING DEVICE

William J. Metzger, East Cleveland, Ohio, assignor to National Malleable and Steel Castings Company, Cleveland, Ohio, a corporation of Ohio Application June 20, 1944, Serial No. 541,209

12 Claims. (Cl. 213—111)

This invention relates to a coupling device and especially to an auxiliary coupling device for railway equipment.

More particularly, this invention provides means for coupling two cars or a locomotive and a car to permit a greater amount of angling necessary to negotiate short curves, such as prevail in industrial plants and the like.

One of the features of this invention resides in the construction of a hook-shaped head which instead of having a pivoted knuckle is formed with a solid hook portion having a deep recess in its contour that permits a substantial amount of angling when used with one of the standard railway car couplers. The improved head of this invention may be used with a coupler having a slotted knuckle in which case the head is pivoted in the slot in the knuckle or two heads may be joined in a suitable manner and one connected to the couplers of adjacent cars or to a locomotive and a car.

Another feature of this invention is a contour on an auxiliary coupling device that may be employed to push cars around sharp curves without jack-knifing—i. e., the coupled coupling device and coupler angle with respect to its associated car only an amount sufficient to permit the cars to pass around the curve and not be forced laterally of the car a maximum amount permitted by the car structure unless that degree of angling is necessary to negotiate the curve.

A more comprehensive understanding of this invention is obtained by reference to the accompanying drawings, in which:

Fig. 9 is a view similar to Fig. 7, with the members angled to an intermediate position in the opposite direction.

Fig. 10 is a view similar to Fig. 8, with the members angled to the maximum amount in the opposite direction.

Fig. 11 is a plan view of a single coupling head pivoted to a slotted knuckle; and Fig. 12 is a vertical sectional view of Fig. 11, along the lines 12—12 thereof.

Figure 1:
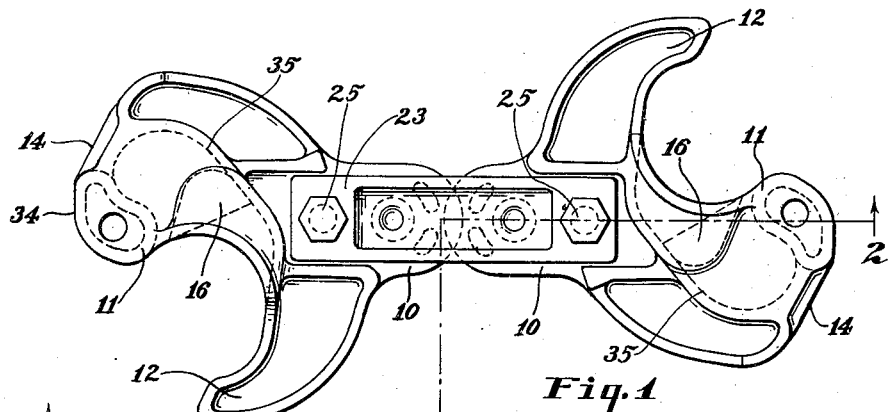
Fig. 1 is a plan view of a pair of coupling heads embodying the invention joined by suitable connecting members.

Referring particularly to Figs. 1 to 5, inclusive, and 11 and 12, each coupling head comprises a shank 10, a hook-shaped portion 11 adapted to couple with the knuckle of an opposing coupler and a guard arm 12. In Fig. 11 the dot-dash line represents an A. A. R. 10—A contour superimposed on the contour of the coupling member of this invention. A portion of the contour of the coupler of this invention is represented by a dotted line identified by the numeral 13 in Fig. 11. It is observed that rearwardly of the line A—A in Fig. 11 the contour of the knuckle of the 10—A coupler and that of the hook-shaped portion of the auxiliary coupler are identical. However, forwardly of line A—A the contour 13 of the hook-shaped member of the auxiliary coupler of the present invention is deeply recessed and extends forwardly and laterally away from the 10—A contour. Moreover, the outer front face 14 of the hook-shaped portion extends rearwardly and laterally away from the front face of the 10—A knuckle. In addition, the inner front face or buffing face 15 of the coupler of this invention is positioned rearwardly of the corresponding face of the 10—A contour. As is hereafter described, these features provide means for obtaining the greater amount of angling required to negotiate sharp curves for which this invention is particularly adapted.

Due to the cut-back of surface 13 and the slope of the surface of the outer front face 14, the metal between them is not enough to withstand excessive stresses that might be imposed by normal operation. To reinforce further the structure, an integral top wall 16 joins the hook-shaped portion with the rest of the head. This wall also forms a support for one of the coupling heads on a coupler during the coupling operation when two of the heads are used, as shown in Fig. 1.

As the contour of the coupling device is relatively loose there is a tendency for the device to droop, so that the head to be coupled to an adjacent coupler is lower than the head that is coupled with a coupler. To overcome this drooping and to facilitate the coupling operation the wall 16 is sloped downwardly and laterally away from the guard arm 12 so that as the drooping head is coupled to an adjacent coupler the closing knuckle slides along the underside of the sloping wall 16 and raises the head to its proper position. Preferably, the wall 16 slopes upwardly and away from a line B—B located approximately ½" from the tip of the hook-shaped member 11 away from contour 13 at an angle between 10° and 30°. It has been found that an angle of approximately 20° is satisfactory for this purpose. This line, B—B, desirably varies in slope between a plane parallel to the outer front face 14 and a plane parallel to the inner front face 15. At an angle desirably from 50° to 70° from the inner front face 15 and tangent to the hooked-shaped portion 11 another line C—C is located from which the sloping wall 16 slopes upwardly and toward the inner front face 15 at an angle of from 10° to 30°, and preferably about 20°. These slopes on the underside of the wall 16 provide approximately a radial gathering means for the knuckle of the coupler to be accommodated. The integral top wall or sloping wall 16 the underside of which slopes downwardly and away from the guard arm 12 and downwardly and toward the hook-shaped part of the head and which joins the hook-shaped part of the head gathers the knuckle of the coupler to which the auxiliary coupler is to be attached.

Figure 2:
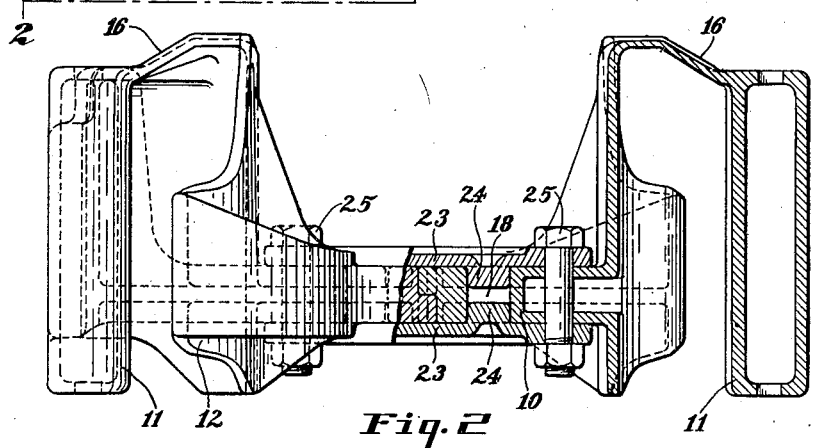
Fig. 2 is an elevational view, partly in section of the device shown in Fig. 1, along the lines 2—2 thereof.
Figures 3, 4:
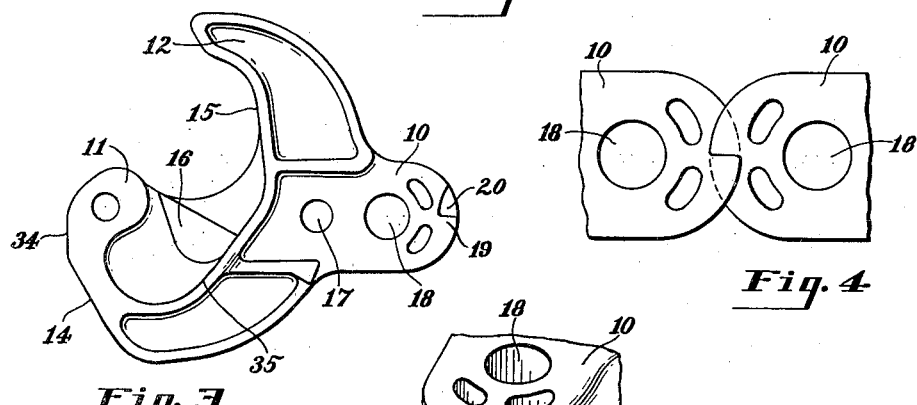
Fig. 3 is a bottom view of one of the coupling heads of this invention.
Fig. 4 is a partial plan view of a pair of associated shanks showing the manner of interfitting.
Figure 5:
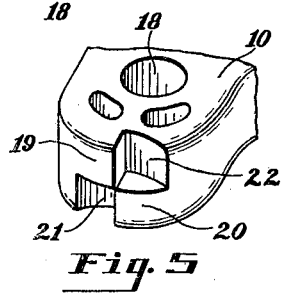
Fig. 5 is a perspective view of the rear end of the shank of the coupling device of this invention.

The shank 10 of each coupling head is formed with openings 17 and 18. Rearward projections 19 and 20 are also provided on each shank. When it is desired to use a pair of coupling heads the shanks of each auxiliary coupling unit are placed facing each other with each projection 19 and 20 fitting into adjacent spaces or recesses 21 and 22 of the opposing shank, as shown in Fig. 4. The projections 19 and 20 are adapted for insertion into the recesses 21 and 22 of a corresponding unit. The recesses 21 and 22 are diagonally oppositely disposed to accommodate the diagonally oppositely disposed projections 19 and 20 which are juxtapositioned to the oppositely disposed diagonally disposed recesses. In this manner a shank of one auxiliary coupler may be quickly and conveniently joined to that of another by means of a joining member 23. Desirably, two joining members 23 are employed for assembling the two auxiliary couplers together. Each joining member 23 has bosses 24 adapted for insertion into the openings 18 of the auxiliary coupler. The joining members 23 are joined together by means of a pair of bolts 25, as shown in Fig. 2. The jointure of the oppositely disposed recesses 21, 22 and oppositely disposed projection, 19, 20 of an auxiliary coupler with the oppositely disposed recesses and oppositely disposed projections respectively of a similar auxiliary coupler prevents horizontal and vertical movement at the jointure.

A single auxiliary coupler unit of this invention is adapted for connection directly to a standard coupler provided with a slotted face knuckle. The auxiliary coupler unit of this invention is inserted in the usual link slot of the knuckle and attached by means of a pin 26, as shown in Figs. 11 and 12. When so employed the lateral angling in one direction of the auxiliary coupler unit is limited by an abutment 27 of the auxiliary coupler by contact with the front face of the knuckle of the coupler to which it is attached, and in the other direction by the guard arm 12 by contact with the guard arm 28 of the coupler to which it is attached.

Figure 6:
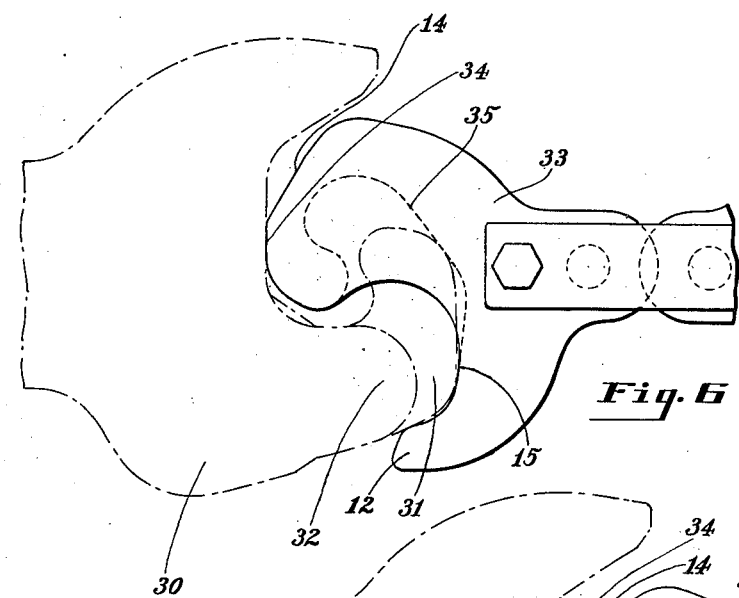
Fig. 6 is a view in buffing position of the coupling device coupled with a coupler of standard contour with no angling between the two members.
Figure 7:
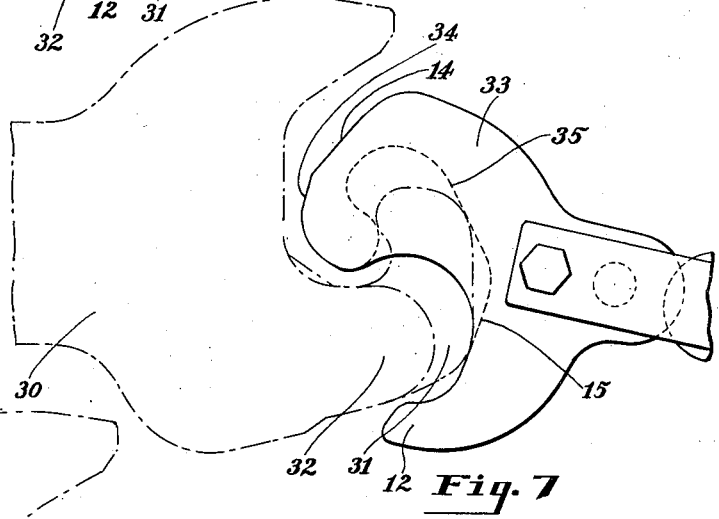
Fig. 7 is a view similar to Fig. 6, with the members angled to an intermediate position in one direction.
Figure 8:
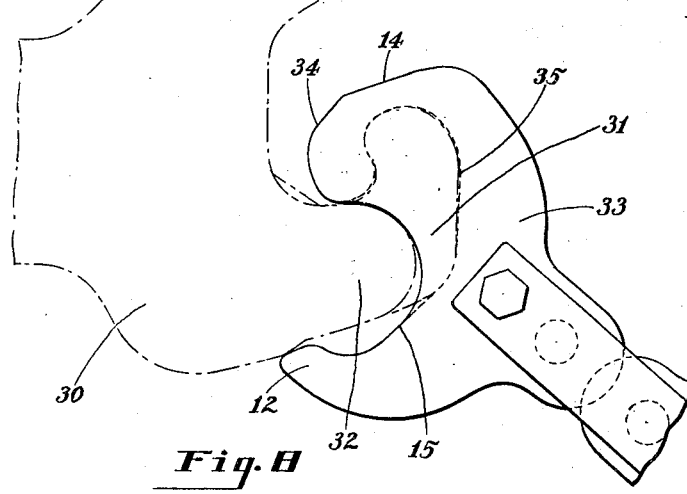
Fig. 8 is a view similar to Fig. 6, with the members angled the maximum amount with respect to each other in one direction.

In Figs. 6 to 10, inclusive, the various positions of the auxiliary coupler are shown when coupled with a standard coupler. In each of these figures the standard coupler is indicated by the dot-and-dash configuration and identified in the drawing by the numeral 30. A knuckle 31 of the standard coupler pivots around a drawbar pivot lug 32 of the standard coupler. The auxiliary coupler 33 of this invention couples with this standard coupler, and the relative condition of coupling when angled, is shown in Figs. 6 to 10, inclusive. The inner contour of the auxiliary coupler is shown by dotted lines. In Fig. 6, for example, the auxiliary coupler 33 coupled with the standard coupler 30 is in a position in which no angling prevails between the two couplers when buffing. Fig. 7 shows the auxiliary coupler angled with respect to the standard coupler to an intermediate position in one direction. Fig. 8 illustrates the maximum amount of angling of the auxiliary coupler in the same direction. Figure 9 shows the auxiliary coupler angled to an intermediate position in the opposite direction, while in Fig. 10 the auxiliary coupler is angled to the maximum position in the direction shown in Fig. 9.

In the specific embodiment illustrated in the drawings, the auxiliary coupler has a contacting surface when coupled with a standard coupler in the extreme angular position in one direction with a contour substantially the same as the nose and knuckle front face of the standard coupler. This contacting surface is illustrated in Fig. 8. When the auxiliary coupler of this invention is coupled with a standard coupler and is in the opposite extreme angular position, as shown in Fig. 10, the contacting surface of the auxiliary coupler with the standard coupler has a contour substantially the same as the standard coupler from the nose through the coupler front face to the end of the guard arm. When the auxiliary coupler is coupled with the standard coupler in the center position when buffing, the contacting surfaces of the auxiliary coupler have a contour substantially the same as the heel of the knuckle and a portion of the front face immediately adjacent to the heel of the knuckle of the standard coupler and a flat face 34 on the hook-shaped portion immediately adjacent to the outer front face of the auxiliary coupler which is substantially perpendicular to the centerline of the auxiliary coupler. This flat surface 34 is desirably at least ¾" in width. When the specific embodiment of the auxiliary coupler shown in the drawing is coupled with a standard coupler in the center position in buff as illustrated in Fig. 6, there is also contact between the nose of the standard coupler and a line on the sloping face 35 of the auxiliary coupler.

This flat surface is also preferably substantially perpendicular to the centerline of the auxiliary coupler. As shown in Fig. 6, the flat face and the inner front face 15 of the auxiliary coupler is so disposed that the flat face and the inner face contacts the standard coupler 30 at the front face and knuckle face respectively of the auxiliary coupler on opposite sides of the longitudinal centerline of the coupler to be accommodated.

The pulling face of the hook-shaped portion 11 of the auxiliary coupler is disposed outwardly and forwardly at an angle greater than 125° to the right side of the longitudinal centerline. Desirably, this angle is greater than 140° and preferably is approximately 155°. The outer face 14 of the auxiliary coupler is disposed outwardly and rearwardly at an angle greater than 100° to the right side of the longitudinal centerline of the auxiliary coupler and desirably greater than 110°. Preferably, this angle is approximately 115°. The inner front face 15 of the auxiliary coupler is disposed outwardly and forwardly at an angle between 92° and 100° to the left side of the longitudinal centerline and preferably approximately 98°.

As shown in Fig. 10, the contour of the specific auxiliary coupler illustrated in the drawings from the beginning of the pulling face of the hook-shaped portion through the outer front face 14 and heel, is substantially the contour of the standard coupler to be accommodated from the point of juncture between the guard arm and the front face through the front face to the pulling face of the standard coupler. As shown in Fig. 8, the contour of the auxiliary coupler from the pulling face of the hook-shaped portion to the beginning of the inner front face 15 is substantially the same as the contour of the standard coupler from the pulling face of the knuckle through the knuckle front face. Desirably, the surface 34 at the end of the outer face adjacent to the pulling face of the auxiliary coupler, as heretofore described, has a substantially flat surface of at least ¾" in width, the flat surface being substantially perpendicular to the longitudinal centerline of the auxiliary coupler.

The contour of the auxiliary coupler is such as to permit an angling of at least 30° in either direction when connected with a standard coupler. When angled laterally in draft with a standard coupler to a position in which there is a minimum of overlapping between the nose of the auxiliary coupler and the nose of the knuckle of the standard coupler, the overlapping of the nose of the knuckle of the standard coupler is at least one-half inch. The flat surface 34 and the inner front face 15 of the auxiliary coupler of this invention are so disposed that the flat face and the inner face contacts the standard coupler to which the auxiliary coupler is coupled at the front face and knuckle face respectively of the standard coupler on opposite sides of the longitudinal centerline of the standard coupler.

While preferred embodiments of this invention have been illustrated and described, various modifications may be made without departing from the scope of the appended claims.

What is claimed is:

1. In an auxiliary coupler including a hook-shaped head and a guard arm, an integral top wall sloping downwardly and away from said guard arm, downwardly and toward the hook-shaped part of said head, joining the hook-shaped part of said head and adapted for guiding the knuckle of the coupler to which said auxiliary coupler is to be coupled during the coupling operation.

2. An auxiliary coupler comprising a shank with recesses and projections thereon, said projections being adapted for insertion into the corresponding recesses of the shank of a similar auxiliary coupler and said recesses being adapted to receive the corresponding projections of the shank of said similar auxiliary coupler for preventing vertical and horizontal movement when joined with said similar auxiliary coupler and joining members for securing the jointure of the shank of said auxiliary coupler with the shank of said similar auxiliary coupler.

3. An auxiliary coupler comprising a shank having diagonally oppositely disposed recesses and diagonally oppositely disposed projections juxtapositioned to said oppositely disposed recesses for jointure to the shank of a similarly constructed auxiliary coupler and joining members for securing the jointure of the shank of said auxiliary coupler with the shank of said similar auxiliary coupler.

4. An auxiliary coupler comprising a shank with recesses and projections thereon, said projections being adapted for insertion into the corresponding recesses of the shank of a similar auxiliary coupler and said recesses being adapted to receive the corresponding projections of the shank of said auxiliary coupler for preventing vertical and horizontal movement of the two joined auxiliary couplers, a hooked-shaped head constructed and arranged to enable lateral angling, when joined to an A. A. R. 10—A contour car coupler, of at least 30° in either direction and an integral top sloped downwardly and away from the guard arm of said coupler and downwardly and toward the hook-shaped part of said head, joining said hook-shaped part and adapted for guiding the knuckle of the coupler to which said auxiliary coupler is to be coupled during the coupling operation.

5. An auxiliary coupler having a head including an outer front face, a hook-shaped portion and a flat surface on said hook-shaped portion adjacent to said outer front face, said head being constructed and arranged to enable lateral angling of at least 30° in either direction of the auxiliary coupler when connected with an A. A. R. 10—A contour coupler and which when angled laterally in draft to a position in which there is a minimum of overlapping between the nose of the auxiliary coupler and the nose of the knuckle of said 10—A contour coupler to which the auxiliary coupler is coupled, the overlapping at the nose of the knuckle of said 10—A contour coupler is at least ½".

6. An auxiliary coupler having a flat surface which is substantially perpendicular to the longitudinal centerline of the auxiliary coupler and an inner face, said flat surface and said inner face being so disposed that said flat surface and said inner face contacts the coupler to be accommodated at the front face and knuckle face respectively thereof on opposite sides of the longitudinal centerline of the coupler to be accommodated.

7. A coupler device having a hook-shaped pulling face disposed outwardly and forwardly at an angle greater than 125° to the right side of the longitudinal centerline of the coupler, an outer face disposed outwardly and rearwardly at an angle greater than 100° to the right side of the longitudinal centerline of said coupler, and a front inner face disposed outwardly and forwardly at an angle between 92° and 100° to the left side of the longitudinal centerline of said coupler.

8. A coupler device having a hook-shaped pulling face disposed outwardly and forwardly at an angle greater than 140° to the right side of the longitudinal centerline of the coupler, an outer face disposed outwardly and rearwardly at an angle greater than 100° to the right side of the longitudinal centerline of said coupler, and a front inner face disposed outwardly and forwardly at an angle between 92° and 100° to the left side of the longitudinal centerline of said coupler.

9. A coupler device having a hook-shaped pulling face disposed outwardly and forwardly at an angle of approximately 155° to the right side of the longitudinal centerline of the coupler, an outer face disposed outwardly and rearwardly at an angle of approximately 115° to the right side of the longitudinal centerline of said coupler, and a front inner face disposed outwardly and forwardly at an angle of approximately 98° to the left side of the longitudinal centerline of said coupler.

10. A pair of auxiliary coupler units joined together comprising two units, the shank of each of which has recesses and projections thereon, said projections of each shank being inserted in the recesses of the shank of the other unit of said pair, a joining member having projections thereon received in a recess in each of said units and fixedly attached to each of said units.

11. An auxiliary coupler having a hook-shaped member which is deeply recessed and which has a contact surface adapted for contact with an A. A. R. 10—A contour coupler and which extends forwardly and laterally away from the contact surface of corresponding portions of said 10—A contour coupler, and an outer face which has a contact surface adapted for contact with said 10—A contour coupler and which extends rearwardly and laterally away from the contact surface of the corresponding portions of said 10—A contour coupler.

12. An auxiliary coupler having a hook-shaped member which is deeply recessed and which has a contact surface adapted for contact with an A. A. R. 10—A contour coupler, said contact surface extending forwardly and laterally away from the contact surface of corresponding portions of said 10—A contour coupler, an outer face which has a contact surface adapted for contact with said 10—A contour coupler and which extends rearwardly and laterally away from the contact surface of corresponding portions of said 10—A contour coupler, an inner front face having a contact surface adapted for contact with said 10—A contour coupler and which is positioned rearwardly of the contact surface of corresponding portions of said 10—A contour coupler, and a flat face on said hook-shaped member immediately adjacent to said outer face which is substantially perpendicular to the longitudinal centerline of the auxiliary coupler.

WILLIAM J. METZGER.

REFERENCES CITED

The following references are of record in the file of this patent:

UNITED STATES PATENTS

| Number | Name | Date |
|---|---|---|
| 682,644 | Sargent | Sept. 17, 1901 |
| 689,644 | Haugh | Dec. 24, 1901 |
| 746,588 | Shephard | Dec. 8, 1903 |
| 754,043 | Bradley | Mar. 8, 1904 |
| 817,342 | Scott | Apr. 10, 1906 |
| 839,771 | Kinne | Dec. 25, 1906 |
| 1,054,812 | Zierath | Mar. 4, 1913 |
| 1,181,989 | Buckwalter | May 9, 1916 |